United States Patent [19]
Traber et al.

[11] 3,869,515
[45] Mar. 4, 1975

[54] KETONES

[75] Inventors: Walter Traber, Riehen; Friedrich Karrer, Basel, both of Switzerland

[73] Assignee: Ciba-Geigy Corporation, Ardsley, N.Y.

[22] Filed: Sept. 13, 1973

[21] Appl. No.: 396,958

[30] Foreign Application Priority Data
Sept. 22, 1972  Switzerland.................... 13866/72

[52] U.S. Cl................................. 260/590, 424/331
[51] Int. Cl........................ C07c 49/76, C07c 49/82
[58] Field of Search.................................... 260/590

[56] References Cited
UNITED STATES PATENTS
2,812,353  11/1957  Kaimel................................ 260/590

*Primary Examiner*—Daniel D. Horwitz
*Attorney, Agent, or Firm*—Harry Falber; Frederick H. Rabin

[57] ABSTRACT

New alkyl-alkenyl ketones of the formula

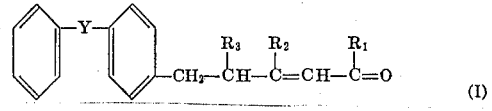

wherein Y represents —$CH_2$— or —O—, $R_1$ represents alkyl with 1 to 4 carbon atoms, and $R_2$ and $R_3$ each represents hydrogen, methyl, or ethyl, and their use for combating pests especially insects are disclosed.

5 Claims, No Drawings

KETONES

The present invention relates to alkyl-alkenyl ketones, process for their manufacture, and to their use in pest control.

The new alkyl-alkenyl ketones have the formula

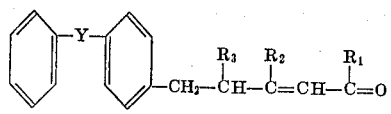
(I)

wherein Y represents —CH$_2$— or —O—, R$_1$ represents alkyl with 1 to 4 carbon atoms, and R$_2$ and R$_3$ each represents hydrogen, methyl, or ethyl.

The alkyl groups represented by R$_1$ can be straight-chain or branched. Examples of such groups include: methyl, ethyl, n-propyl, isopropyl, n-, i-, sec.- and tert.-butyl.

Preferred compounds on account of their action are those of the formula I, wherein Y represents —O—, CH$_2$—, R$_1$ and R$_2$ each represents methyl or ethyl, and R$_3$ represents hydrogen.

The compounds of the formula I are manufactured in known manner by the following methods:

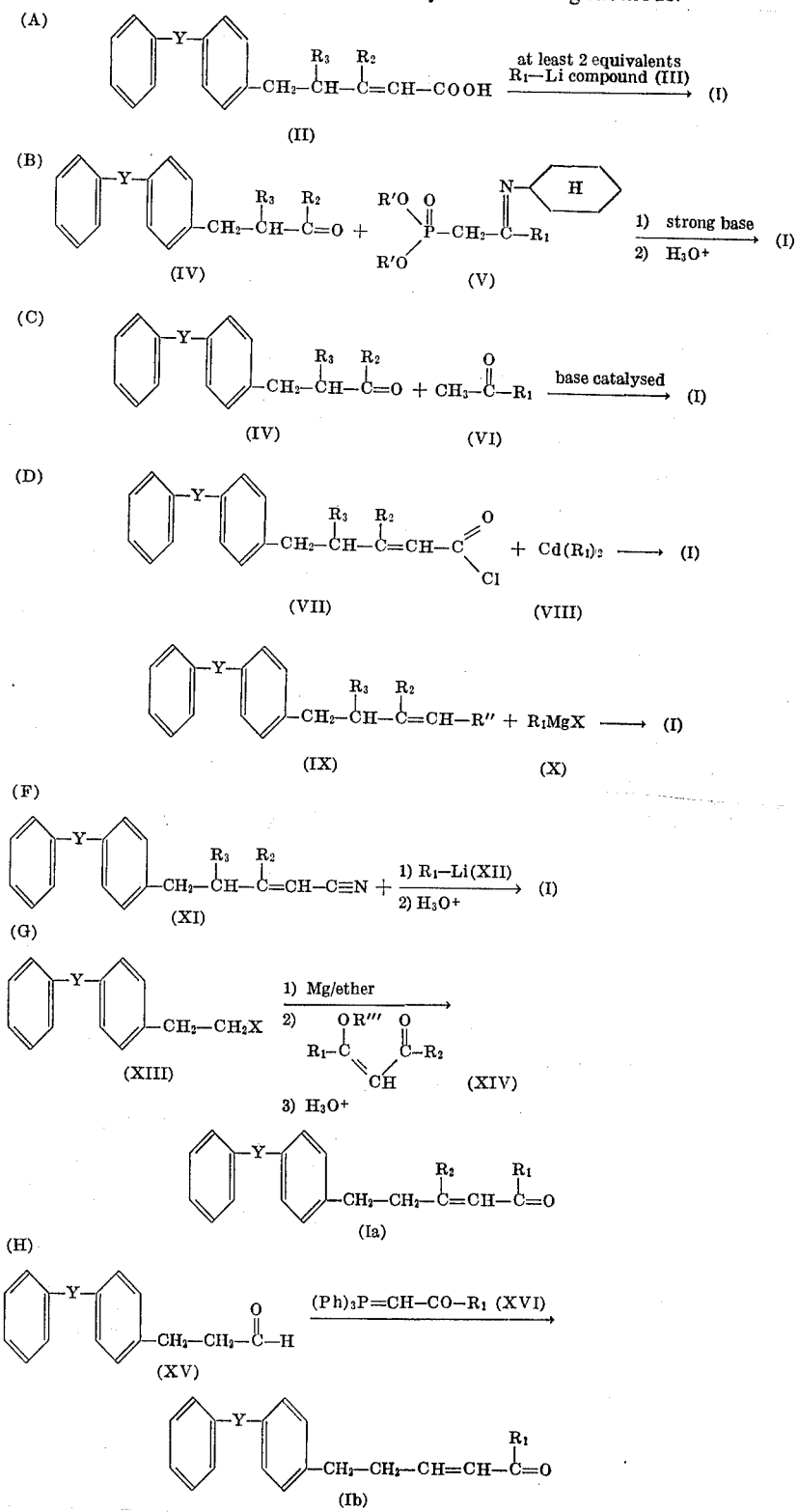

In the formulae Ia, Ib, and II to XVI $R_1$ to $R_3$ and Y have the meanings given for the formula I, R' represents alkyl with 1 to 4 carbon atoms, R'' represents $-C \equiv N$, $-COOCH_3$ or $-COOC_2H_5$, X represents halogen, especially chlorine, bromine, or iodine, and R''' represents methyl or ethyl.

According to equation A), and $\alpha,\beta$-unsaturated carboxylic acid of the formula II is reacted with at least 2 moles of a lithium-alkyl compound of the formula III in a dry, inert solvent (e.g., dialkyl ether, tetrahydrofuran, dimethoxyethane, benzene, toluene, etc.) while cooling at $-20°C$ to $+30°C$, preferably at $-5°$ to $+10°C$.

The ketone of the formula I is isolated by treating the reaction mixture with dilute aqueous acid, extracting with diethyl ether and, if necessary, subsequently purifying the product obtained over adsorbents such as silica gel and aluminium oxide by chromatography, or by distillation in a high vacuum.

The process according to equation (B) is carried out by reacting a $\gamma$-(phenoxyphenyl)-ketone of the formula IV with an activated ketophosphonic acid derivative of the formula V, (for the manufacture of V, vid. Tetrahedron Letters 1,401–1,404 and 1,397–1,400, 1971) in an inert solvent.

The phosphonate the formula V is deprotonised first with a strong base, e.g., an alkali hydride, alkali amide, alkali oxide, or alkali hydroxide, in an inert solvent, e.g., tetrahydrofuran, dioxan, 1,2-dimethoxyethane, diethylene glycol diethyl ether, an aromatic hydrocarbon or a dialkyl ether, between $-10°$ and $+40°C$, in most cases between $0°C$ and room temperature, and subsequently treated with a ketone of the formula IV. The reaction temperatures for this condensation are preferably in the range between $-10°C$ and the boiling temperature of the solvent used, in most cases between $0°C$ and $70°C$. The chosen reaction temperature depends on the reactivity of the ketone of the formula IV. The $\alpha,\beta$-unsaturated ketone I is isolated by treating the reaction mixture with a dilute, aqueous organic or inorganic acid, e.g., with oxalic acid solution or with a suspension of silica gel in water. Extraction of the reaction mixture with an organic solvent, e.g., diethyl ether, methylene chloride, etc., drying over sodium sulphate, and removal of the solvent by suction filtration are effected in the usual manner. The further purification of the crude product can be effected by distillation in a high vacuum, crystallization, or adsorption chromatography.

The aldol condensation according to equation (C) can be performed according to G. Wittig, Angew. Chem. 80,8 (1968) with a ketone of the formula IV and a ketone derivative of the formula VI.

The reaction of an acid halide, especially of an acid chloride of the formula VII, with a dialkyl-cadmium compound of the formula VIII according to equation (D), takes place in an inert atmosphere in an inert solvent, e.g., tetrahydrofuran, a dialkyl ether, as well as under the reaction and processing conditions customary for Grignard reactions.

The reaction of a nitrile or of an ester of the formula IX ($R'' = CN$, $COOCH_3$, or $COOC_2H_5$) with one equivalent of an alkylmagnesium halide of the formula X according to equation (E) takes place between $-20°$ and $+40°C$ in an inert solvent (e.g., tetrahydrofuran, a dialkyl ether, hexamethylphosphoric acid triamide, 1,2-dimethoxyethane, etc.) and under the processing conditions customary for Grignard reactions. The further purification can be performed as described hereinbefore by physical methods of seperation.

The reaction of a nitrile of the formula XI with a lithium-alkyl compound of the formula XII according to equation (F) is carried out between $-20°$ and $+20°C$ in an inert solvent as in process (A), with subsequent treatment of the reaction mixture with dilute acid and physical, in particular chromatographic, purification of the crude product.

According to equation (G), a 2-aryl-1-haloethane derivative of the formula XIII is reacted between $-20°C$ and $+40°C$ with magnesium in an ether, e.g., diethyl ether, tetrahydrofuran, 1,2-dimethoxyethane, to give the Grignard compound. The Grignard compound is treated, e.g., with a 4-alkoxy-3-penten-2-one derivative of the formula XIV, wherein R''' represents methyl or ethyl. The enol ether is subsequently hydrolysed accompanied by splitting off of water in the presence of an acid. The further purification can be performed as described hereinbefore by physical methods of separation.

According to equation (H), a 3-aryl-propionaldehyde derivative of the formula XV is reacted with triphenyl-acylmethylenephosphoranes of the formula XVI [vid.J. Org. Chem. 27, 998 (1968)] in an ether, e.g., tetrahydrofuran, under reflux, and the resulting product is purified as described hereinbefore by physical methods of separation.

According to the above syntheses (B), (C), (G), and (H) there occur isomeric mixtures which, if desired, can be separated by physical methods of separation, for example fractional crystallisation, fraction distillation, adsorption or gas chromatography.

Some of the starting materials of the formulae II, IV, V, XII, IX, XI, XIII, XIV and XV are known and can be manufactured by known methods.

Where not otherwise stated, the described compounds constitute mixtures of the geometric isomers such as occur during the synthesis.

The compounds of the formula I can be used for combating animal and plant pests.

In particular they are suitable for combating insects of the families:

Tettigonidae, Gryllidae, Gryllotalpidae, Blattidae, Reduviidae, Phyrrhocoridae, Cimicidae, Delphacidae, Aphididae, Diaspididae, Pseudococcidae, Scarabaeidae, Dermestidae, Coccinellidae, Tenebrionidae, Chrysomelidae, Bruchidae, Tineidae, Noctuidae, Lymatriidae, Pyralidae, Culcidae, Tipulidae, Stomoxydae, Trypetidae, Muscidae, Calliphoridae and Pulicidae.

The insecticidal action can be substantially broadened by addition of other insecticides and/or acaricides and adapted to given circumstances.

The compounds according to formula I can also be combined with insect baits.

Examples of suitable additives are:
organic phosphorus compounds
derivatives of nitrophenols
formamidines
ureas
carbamates and
chlorinated hydrocarbons.

The compounds of the formula I may be used as pure active substance or together with suitable carriers and/or additives. Suitable carriers and additives can be solid or liquid and correspond to the substances conventionally used in formulation technique, for example natural or regenerated substances, solvents, dispersants, wetting agents, adhesives, thickeners, binders and/or fertilisers.

For application, the compounds of the formula I may be processed to dusts, emulsion concentrates, granules, dispersions, sprays, to solutions, or suspensions, in the conventional formulation which is commonly employed in application technology.

The agents according to the invention are manufactured in known manner by intimately mixing and/or grinding active substances of the formula I with the suitable carriers, optionally with the addition of dispersants or solvents which are inert towards the active substances. The active substances may take, and be used in, the following forms:

Solid forms:

Dusts, tracking agents, granules, coated granules, impregnated granules and homogeneous granules.

Liquid forms:
a. active substances which are dispersible in water: wettable powders, pasts, emulsions;
b. solutions.

The content of active substance in the above described agents is between 0 and 95 percent.

The active substances of the formula I can, for example, be formulated as follows:

Dusts

The following substances are used to manufacture (a) a 5 percent and (b) a 2 percent dust:
a. 5 parts of active substance
   95 parts of talcum
b. 2 parts of active substance
   1 part of highly disperse silicic acid
   97 parts of talcum.

The active substances are mixed with the carriers and ground.

Granules

The following substances are used to produce 5 percent granules:
  5 parts of active substance,
  0.25 parts of epichlorohydrin,
  0.25 parts of cetyl polyglycol ether,
  3.50 parts of polyethylene glycol,
  91 parts of kaolin (particle size 0.3 – 0.8 mm).

The active substance is mixed with epichlorohydrin and dissolved with 6 parts of acetone; the polyethylene glycol and cetyl polyglycol ether are then added. The thus obtained solution is sprayed on kaolin, and the acetone subsequently evaporated in vacuo.

Wettable powder

The following constituents are used for the preparation of (a) a 40 percent, (b) and (c) a 25 percent, and (d) a 10 percent wettable powder:
a. 40 parts of active substance,
   5 parts of sodium lignin sulphonate,
   1 part of sodium dibutyl-naphthalene sulphonate,
   54 parts of silicic acid.
b. 25 parts of active substance,
   4.5 parts of calcium lignin sulphonate,
   1.9 parts of Champagne chalk/hydroxyethyl cellulose mixture (1:1),
   1.5 parts of sodium dibutyl naphthalene sulphonate,
   19.5 parts of silicic acid,
   19.5 parts od Champagne chalk,
   28.1 parts of kaolin.
c. 25 parts of active substance,
   2.5 parts of isooctylphenoxy-polyoxyethylene-ethanol,
   1.7 parts of Champagne chalk/hydroxyethyl cellulose mixture (1:1),
   8.3. parts of sodium aluminium silicate,
   16.5 parts of kieselguhr,
   46 parts of kaolin.
d. 10 parts of active substance,
   3 parts of a mixture of the sodium salts of saturated fatty alcohol sulphates,
   5 parts of naphthalenesulphonic acid/formaldehyde condensate,
   82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates

The following substances are used to produce (a) a 10 percent and (b) a 25 percent emulsifiable concentrate:
a. 10 parts of active substance,
   3.4 parts of epoxidised vegetable oil,
   13.4 parts of a combination emulsifier consisting of fatty alcohol polyglycol ether and alkylarylsulphonate calcium salt,
   40. parts of dimethylformamide,
   43.2 parts of xylene.
   25 parts of active substance,
   2.5 parts of epoxidised vegetable oil,
   10. parts of an alkylarylsulphonate/fatty alcohol-polyglycol ether mixture,
   5 parts of dimethylformamide,
   57.5 parts of xylene.

From these concentrates it is possible to produce, by dilution with water, emulsions of any desired concentration.

Spray

The following constituents are used to prepare a 5 percent spray:
  5 parts of active substance,
  1 part of epichlorohydrin,
  94 parts of benzine (boiling limits 160° – 190°C).

EXAMPLE 1

While stirring vigorously, 45 ml of an approximately 0.95 molar solution of ethyl lithium in benzene are added dropwise at −2° to 0°C within 30 minutes to a solution of 5.64 g of dry 5-(4-phenoxyphenyl)-3-methyl-2-trans-pentenoic acid (m.p. 91°–92°C; manufactured by alkaline hydrolysis of 5-(4'-phenoxyphenyl)-3-methyl-2-pentenoic acid ethyl ester and recrystallisation from ether/hexane) in 120 ml of absolute diethyl ether in an inert atmosphere. Stirring is subsequently continued for 1 hour at 0°C and for 2 hours at room temperature. The reaction mixture is processed by treating it carefully with 200 ml of 0.5 normal hydrochloric acid at about 0°C with stirring, isolating the ethereal phase, and washing the aqueous phase three times with ether. The combined ethereal phases are wasted finally with potassium carbonate solution, then with water, and dried over sodium sulphate. The ether is distilled off in vacuo. The resulting crude product is further purified by chromatography on silica gel (eluant: ether/hexane 1:3) to yield pure 1(4-phenoxyphenyl)-3-methyl-3-trans-hepten-5-one. (IR: 1,692 (C=O), 1,622, 1,495, 1,243 cm$^{-1}$).

EXAMPLE 2

11.8 g of 50 percent sodium hydride in mineral oil is washed repeatedly with diethylene glycol dimethyl ether and put into a sulphurating flask in 350 ml of diethylene glycol dimethyl ether. Then 60 g of 1-diethoxy-phosphinyl-2-(N-cyclohexylimino)-propane are added dropwise at 0°C. The mixture is subsequently stirred at room temperature until the evolution of hydrogen has ceased. After cooling once more to 0°C, 29.4 g of 4-(4'-phenoxyphenyl)-butan-2-one are added dropwise. After 2 hours the reaction mixture is heated slowly to 50°–60°C and kept overnight at this temperature. After being cooled to 20°C, the reaction mixture is poured into one litre of 10 percent aqueous oxalic acid solution. The mixture is extracted three times with diethyl ether, the combined ethereal phases are washed with water, dried over sodim sulphate, filtered off, and the solvent distilled off, to yield 35.8 g of an oil which is filtered through a short silica gel column (eluant: cyclohexane/ethyl acetate 4:1). After the solvent has been distilled off from the eluate, the resulting oily residue is chromatographed once more on silica gel with the same solvent mixture to yield pure 6-(4'-phenoxyphenyl)-4-methyl-3-hexen-2-one (cis/trans mixture)- Boiling point: 140°–150°C/0.001 Torr.

The following compound is also manufactured by proceeding in a manner anologous to that described in Examples 1 and 2.

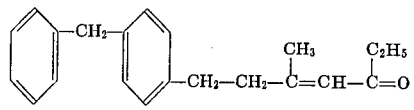

EXAMPLE 3

A. Topical action on *Dysdercus fasciatus* larvae

10 *Dysdercus fasciatus* larvae were treated topically with solutions of active substance in acetone 8–10 days before they were due to shed and emerge to the adult stage. The larvae were then kept at 28°C and 80–90 percent relative humidity. They were fed with meal made from premoistened cotton seeds. After about 10 days, i.e., as soon as the untreated larvae had shed and emerged fully to the adult stage, the treated test subjects were examined for the number of normal adults.

B. Contact action on *Dysdercus fasciatus* larvae

A specific amount of a 0.1 percent active substance solution in acetone (corresponding to 10 mg of active substance per m$^2$) was pipetted into an aluminium dish and uniformly distributed. After the acetone had evaporated. 10 *Dysdercus fasciatus* larvae in the fifth stage, which were provided with feed and moist cotton wool, were placed in the treated dish. The dish was then covered with a screen top.

After about 10 days, i.e., as soon as the controls had shed and emerged to the adult stage, the treated test subjects were examined for the number of adults.

In the above tests (A) and (B) the compounds according to Examples 1 and 2 exhibited good action.

EXAMPLE 4

Topical action on *Dermestes lardarius* pupae 10 fresh *Dermestes lardarius* pupae at a time were treated topically with solutions of active substance in acetone. The pupae were then kept at 28°C and 80–90 percent relative humidity. After about 10 days, i.e., as soon as the controls had emerged from the cocoon as Imagines, the test subjects were examined for the number of normal adults.

In the above test, the compounds according to Examples 1 and 2 exhibited good action.

EXAMPLE 5

Contact action on *Tenebrio molitor* pupae

A specific of a 0.1% solution of active substance in acetone (corresponding to 10 mg of active substance/m$^2$) was pipetted into an aluminium dish and evenly distributed. After the acetone had evaporated, 10 freshly shed pupae were placed on the treated surface. The dish was covered with a screen top.

After the controls had emerged from the cocoon as Imagines, the test subjects were examined for the number of normal adults.

In the above test, the compounds according to Examples 1 and 2 exhibited good action.

We claim:

1. Compounds of the formula

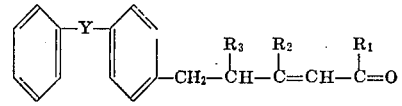

wherein Y represents —CH$_2$— or —O—, R$_1$ represents alkyl 1 to 4 carbon atoms, and R$_2$ and R$_3$ each represents hydrogen, methyl, or ethyl.

2. Compounds according to claim 1, wherein Y represents —O—, CH$_2$—, R$_1$ and R$_2$ each represents methyl or ethyl, and R$_3$ represents hydrogen.

3. 1-(4'-phenoxyphenyl)-3-methyl-3-hepten-5-one, according to claim 2.

4. 1(4'-phenoxyphenyl)-3-methyl-3-hexen-5-one, according to claim 2.

5. 1-(4'-benzylphenyl)-3-methyl-3-hepten-5-one, according to claim 2.

* * * * *

UNITED STATES PATENT OFFICE
CERTIFICATE OF CORRECTION

PATENT NO. : 3,869,515
DATED : March 4, 1975
INVENTOR(S) : Walter Traber, Friedrich Karrer It is certified that error appears in the above—identified patent and that said Letters Patent are hereby corrected as shown below:

Title page, item [30], add the following:

August 17, 1973 Switzerland...............11807/73

Signed and Sealed this twentieth Day of January 1976

[SEAL]

Attest:

RUTH C. MASON
*Attesting Officer*

C. MARSHALL DANN
*Commissioner of Patents and Trademarks*